Patented Aug. 29, 1944

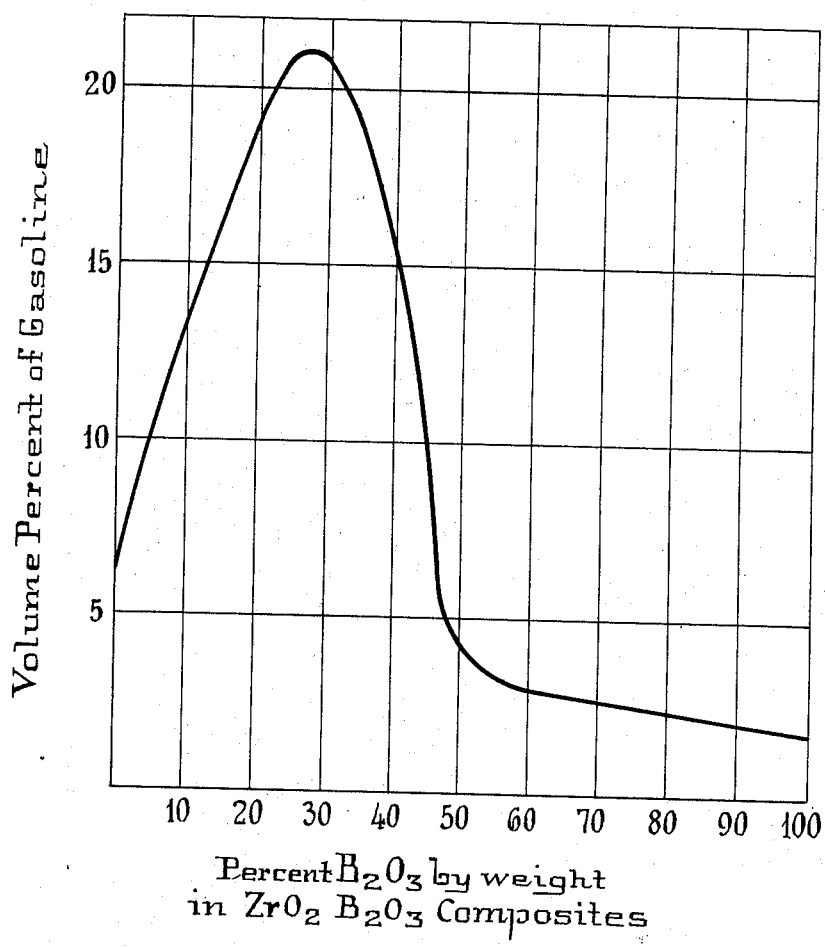

2,356,978

UNITED STATES PATENT OFFICE 2,356,978

CATALYTIC CONVERSION OF HYDROCARBONS

Joseph D. Danforth, Chicago, Ill., assignor to Universal Oil Products Company, Chicago, Ill., a corporation of Delaware Application June 27, 1942, Serial No. 448,761

9 Claims. (Cl. 196—52)

This is a continuation-in-part of my co-pending application Serial No. 304,697, filed November 16, 1939.

The present invention relates to a process for the conversion of hydrocarbons such as petroleum fractions and hydrocarbonaceous matter generally, including synthetic oil from numerous carbon-containing sources, in the presence of catalysts to produce substantial yields of lower boiling fractions within the gasoline boiling range having high anti-knock value.

The process is applicable to conversions involving single hydrocarbons, synthetically produced hydrocarbon mixtures or primary distillates produced in the destructive distillation of hydrocarbon-containing material such as coals, lignites and shales. Although a wide range of hydrocarbons may be processed, more frequently the hydrocarbon fractions charged to the process are of a distillate character and vaporizable without substantial decomposition.

In general the invention is concerned with the modification of hydrocarbon conversion processes involving the use of specific catalysts which selectively promote the hydrocarbon reactions involved in the formation of high anti-knock gasoline.

It is recognized that commercial processes are in operation in which relatively high boiling hydrocarbon fractions are cracked in the presence of catalysts to produce substantial yields of high octane number gasoline and gases which contain high percentages of readily polymerizable olefins. The selection of catalysts suitable for selectively accelerating the cracking reactions in the direction of improved products is based largely upon empirical considerations. The choice of the catalyst for use in any given cracking process will be influenced by the material to be treated, the desired product distribution and the quality of the principal products, and it is difficult to predict that any one of the tried catalytic materials will be best suited for any particular cracking process until a great many factors have been considered. For example, one catalyst might be chosen where it is desired to make high octane automotive fuel and another catalyst might be used if it is desired to produce increased yields of by-product gas mixtures which would contain polymerizable olefins or mixtures of paraffins and olefins which could be reacted to produce higher molecular weight gasoline boiling range compounds by alkylation reactions. There are substances having catalytic activity in hydrocarbon conversions which respond in varying degrees to the addition of boric oxide, indicating that the precise effect of the addition of this substance is not predictable. For example, the catalytic activity of alumina has been found to be increased by additions of boric oxide to make an active catalyst for use in cracking reactions. However, the addition of boric oxide to magnesia has very little effect, and similarly, the addition of boric oxide to silica does not produce any substantial improvement in the catalytic activity of the silica.

In one specific embodiment the present invention comprises subjecting hydrocarbon oil at elevated temperatures and relatively low superatmospheric pressure to contact with particles of a synthetically prepared composite catalyst consisting essentially of boric oxide composited with hydrated zirconia to produce substantial yields of high anti-knock gasoline.

The catalyst which characterizes the process of the present invention consists of a heretofore unknown composite of zirconia with minor proportions of boric oxide, the composite exhibiting a high order of activity for accelerating cracking reactions. The catalyst composites may be prepared by a number of alternative methods which will be subsequently described in more detail. The two components of the composite, that is, zirconia and boric oxide, show low catalytic activity individually but when composited form a highly active cracking catalyst. The activity is not an additive function and neither component is necessarily to be considered as the support or carrier while the remaining component constitutes the active catalyst. The components of the catalyst are referred to as the compounds obtained in the chemical analysis of the completed catalyst preparation, but no definite knowledge is available as to the specific nature of the active catalytic surfaces or the manner of chemical combination of the metal compounds comprising the active catalyst.

The character and efficiency of the catalysts will depend more or less upon the relative amounts of zirconia and boric oxide. The ratio in which the components are mixed may be varied within relatively wide limits. For example, a good catalytic activity was obtained in one set of tests when using composites containing 20 to 45 mol percent of boric oxide and 80 to 55 mol percent zirconia. Less favorable activity was found within the range of 45 to 70 mol percent of boric oxide. Catalytic effects of lower order have been experienced outside of these ranges using the essential components, and different ranges of activity may be expected when using different methods of compositing. For example, when zirconia is impregnated with boric oxide, catalysts of high activity may be prepared with a boric oxide content of only 8%. In general, however, minor proportions of boric oxide are used with major proportions of the zirconia.

Numerous methods of compositing the boric oxide with the zirconia are possible and the scope of the present invention is not considered as limited to the methods here described. A suitable grade of zirconia, for example a dried gel of this oxide may be mixed in powdered condition with boric oxide and the composite may be heated at an ordinary drying temperature, for example about 200° C. Upon cooling, the powdered mixture may be consolidated and formed into particles by conventional processes such as pressing, pelleting and extruding. In an alternative procedure salts such as zirconium oxychloride, etc., which decompose on heating in the presence of moisture to zirconium oxide may be intimately admixed with the boric oxide and the mixture heated until the salt has decomposed and formed an oxide. The oxychloride need not necessarily be used, other salts such as, for example, the nitrate, sulfate, acetate, and oxalate of zirconium being utilizable. As an example of further alternative methods, boric anhydride as well as boric acid, or a perborate, may be dissolved in water and a soluble salt of zirconium added in the desired proportions. Alkaline precipitants such as ammonium hydroxide, for example, may then be added to precipitate zirconia hydrate which absorbs the boron compound, whereupon the precipitate is filtered and dried, washed if necessary and formed into particles as above.

More or less inert materials may be admixed with the zirconia-boric oxide composites to serve as spacing agents and for the purposes of lending support to the catalytic material. These may be present in proportions up to 80%, more or less, of the final catalyst material. Many such materials are generally known such as clay, fuller's earth, bentonite, montmorillonite, infusorial earth, diatomaceous earth or kieselguhr and zeolites, glauconites, etc., also dried silica gel, pumice, rutile, ilmenite, chromite, etc.

The catalysts of the present invention may be conveniently used in carrying out reactions when employed as filling material in tubes or chambers in the form of small pellets or granules. The average particle size may vary within the approximate range of 2 to 10 mesh, more or less, and may apply either to pellets of uniform size, in short cylindrical shapes, or to particles of irregular shape produced as, for example, by consolidating and sizing powdered catalytic material.

While the simple method of preheating a given fraction of hydrocarbon oil to be processed to a temperature suitable for its conversion in contact with the catalyst, and then passing the vapors over a stationary mass of the catalyst particles, may be employed, it is generally preferable to pass the preheated vapors through the catalyst where the passage of vapors is restricted to definite paths rather than allowing the vapors to have unrestricted contact with large beds of catalytic material. It is thus possible to control more accurately the temperature of the contact materials both in use and during regeneration. After the passage of oil vapors over the catalyst, the products may be separated into fractions unsuitable for further cracking, intermediate insufficiently converted fractions suitable for further catalytic cracking treatment, a gasoline boiling range fraction, and gases. The intermediate fractions may be returned directly to admixture with the charging stock or processed in separate passes so as to obtain ultimately the maximum utilization of the charging stock in producing the gasoline product. Although the above is more conventional practice, it is also possible to suspend the catalyst in the stream of oil as a powder and treat the suspension under conditions of temperature, pressure and contact time adequate to effect a desired degree of conversion.

The normally gaseous fraction separated from the gasoline product when using the present types of catalysts in cracking contains much larger proportions of readily polymerizable olefins, more particularly propene and butenes, than are usually present in the gases from ordinary thermal cracking, or cracking with certain other types of catalysts and these olefins may be readily polymerized using thermal and/or catalytic processes to produce additional yields of gasoline to be blended, if desired, with the primary gasoline product produced in the process. The application of the present invention to conversion of hydrocarbon fractions besides being characterized by the use of novel catalysts is also characterized by the moderate operating conditions of temperature and pressure. Temperatures employed in contact with the catalysts may be within the range of about 750° F. and about 1100° F., and substantially atmospheric pressure or moderately superatmospheric pressure up to several hundred pounds per square inch may be used. The pressures are somewhat governed by the flow conditions through the vaporizing and conversion zones and the subsequent separating, fractionating and collecting equipment but are most frequently below 100 pounds per square inch.

The following specific examples are given to illustrate the process of the invention, and the methods of catalyst preparation therefor. The process should not be considered as limited to these examples of the process or to the particular methods of catalyst preparation.

*Example I*

In this example a catalyst was prepared containing approximately 40 mol percent of boric anhydride and 60 mol percent of zirconia. 462 parts by weight of hydrated zirconia and 35 parts by weight of boric oxide were mixed and dried at approximately 220–240° F. The dried material was pulverized and then consolidated to form granules of approximately 6–10 mesh particle size. The granules were then heated at approximately 900° F. for one hour. Particles of this catalyst were used as filler in a reactor and a paraffinic gas oil was contacted with the catalyst at a temperature of 932° F., a superatmospheric pressure of 15 pounds per square inch, using an hourly liquid space velocity of 4. A 33% yield of 400° F. gasoline was obtained during the first hour and at the end of the sixth hour the gasoline production had dropped to 23%, the total gasoline having an octane number of approximately 79. After catalyst regeneration a total yield for a six hour process period of 26.5% of gasoline was obtained having the same octane number. When contacting the hydrocarbon vapors at a temperature of 800° F. and using a liquid hourly space velocity of 1, 22.7% of gasoline was obtained having an octane number of approximately 78.

Tests were conducted to show the activities of zirconia alone and boric oxide alone. The zirconia was made by following the same procedure as in the preparation of the zirconia-boric oxide without the addition of the boric oxide, and boric oxide of 6 to 10 mesh size granules was prepared by grinding and sizing a fused and cooled cake. Tests were then conducted with these two materials by passing a paraffinic gas oil over them at 932° F., 15 pounds superatmospheric pressure and an hourly liquid space velocity of 4, and it was found that pure zirconia gave a yield of gasoline of 7% by volume of the charge while the boric oxide gave a yield of 2%. These tests compared with the preceding tests on the zirconia-boric oxide mixture indicate that the effects of the two components in the composite catalysts are more than additive.

*Example II*

A series of catalysts varying in composition from one consisting entirely of zirconia to one consisting entirely of boric oxide were prepared by heating zirconium oxychloride hydrate alone and in admixture with increasing amounts of boric oxide. A series of eight catalysts were prepared and tested by a standard method involving passage of a Pennsylvania gas oil over the catalysts at a temperature of 932° F., substantially atmospheric pressure and an hourly space velocity of 8 for a period of two hours. The significant results obtained in these tests, indicating the variations in catalyst activity with composition are shown in the attached graph which was made by plotting the composition of the catalysts against the volume percent gasoline produced based on the gas oil charged.

Reference to the graph shows that the activity of the catalysts measured by the percentage of gasoline produced under the standard test conditions passed through a maximum at about 27% boric oxide by weight in the zirconia boric oxide composites. After about 50% boric oxide is exceeded the activity continues at a slowly decreasing rate until an activity corresponding to about 2% gasoline production is reached corresponding to pure boric oxide. On the other end of the scale the pure zirconium oxide shows a yield of about 6½% of gasoline. Practical yields of gasoline were obtained with composites containing from about 10 to about 45 percent of boric oxide.

I claim as my invention:

1. A process for the conversion of hydrocarbons, which comprises subjecting said hydrocarbons at a cracking temperature to contact with a catalyst comprising essentially zirconium oxide and boron oxide.

2. A process for the conversion of hydrocarbons which comprises subjecting a hydrocarbon oil at a temperature of from about 750° F. to about 1100° F. to contact with a catalyst comprising essentially zirconium oxide and boron oxide.

3. A process for converting a hydrocarbon oil to substantial yields of high anti-knock motor fuel which comprises subjecting said oil at a temperature of from about 750° F. to about 1100° F. to contact with a calcined mixture of zirconium oxide and boric oxide.

4. A hydrocarbon conversion catalyst comprising essentially a calcined mixture of zirconium oxide and boric oxide.

5. A hydrocarbon conversion catalyst comprising essentially a calcined mixture of zirconium oxide, boric oxide and a relatively inert spacing material.

6. A process for the conversion of hydrocarbons which comprises subjecting said hydrocarbons at a cracking temperature to contact with a composite catalyst comprising essentially zirconium oxide and boric oxide, the weight percentage of boric oxide in the composite being in the range from about 10 to about 45%.

7. A process for the conversion of hydrocarbons which comprises subjecting said hydrocarbons at a temperature of from about 750° F. to 1100° F. to contact with a composite catalyst comprising essentially zirconium oxide and boric oxide, the weight percentage of boric oxide in the composite being in the range from about 10 to about 45%.

8. A hydrocarbon conversion catalyst comprising essentially a calcined mixture of zirconium oxide and boric oxide in which the weight percentage of boric oxide ranges from about 10 to about 45%.

9. A hydrocarbon conversion catalyst composite comprising essentially a calcined mixture of zirconium oxide, boric oxide and a relatively inert spacing material, the percentage by weight of the zirconium oxide content being relatively greater than that of the boric oxide.

JOSEPH D. DANFORTH.